US010520351B2

(12) United States Patent
Johansen et al.

(10) Patent No.: US 10,520,351 B2
(45) Date of Patent: Dec. 31, 2019

(54) METHOD AND APPARATUS FOR PEAK WEIGHT DETECTION

(71) Applicant: Digi-Star, LLC, Oakland, NJ (US)

(72) Inventors: Steven L. Johansen, Whitewater, WI (US); Jerome A. Bump, Fort Atkinson, WI (US)

(73) Assignee: DIGI-STAR, LLC, Fort Atkinson, WI (US)

( * ) Notice: Subject to any disclaimer, the term of this patent is extended or adjusted under 35 U.S.C. 154(b) by 84 days.

(21) Appl. No.: 15/290,540

(22) Filed: Oct. 11, 2016

(65) Prior Publication Data

US 2018/0100759 A1    Apr. 12, 2018

(51) Int. Cl.
| | |
|---|---|
| *G01G 19/02* | (2006.01) |
| *G01G 19/08* | (2006.01) |
| *G01G 23/00* | (2006.01) |
| *A01B 76/00* | (2006.01) |

(52) U.S. Cl.
CPC ........... *G01G 19/022* (2013.01); *A01B 76/00* (2013.01); *G01G 19/08* (2013.01); *G01G 23/005* (2013.01)

(58) Field of Classification Search
CPC ............................ G01G 19/022; G01G 19/024
See application file for complete search history.

(56) References Cited

U.S. PATENT DOCUMENTS

| | | | | |
|---|---|---|---|---|
| 5,742,010 A | * | 4/1998 | Griffin | ................ A01F 15/0875 177/145 |
| 5,831,343 A | | 11/1998 | Nakazaki | |
| 6,572,257 B2 | * | 6/2003 | Bump | .................... A01K 5/002 366/141 |
| 7,211,745 B1 | * | 5/2007 | Brown | ................... G01G 19/12 177/1 |
| 7,454,304 B2 | | 11/2008 | Johansen et al. | |

(Continued)

FOREIGN PATENT DOCUMENTS

| | | |
|---|---|---|
| EP | 1950539 A2 | 7/2008 |
| WO | 2006080611 A1 | 8/2006 |

OTHER PUBLICATIONS

International Search Report and Written Opinion dated Jan. 3, 2018 from International Patent Application No. PCT/US2017/053577.

*Primary Examiner* — Natalie Huls
(74) *Attorney, Agent, or Firm* — Chiesa Shahinian & Giantomasi PC

(57) ABSTRACT

A method for determining a peak weight associated with an agricultural machine includes the step of determining a weight associated with the agricultural machine. Operational parameters are stored in response to determining that the weight is above a threshold. The threshold can be based on a maximum weight associated with the agricultural machine and set via user input to a machine control indicator. In one embodiment, a new weight associated with the agricultural machine is determined. The new weight is compared to a previous peak weight associated with the agricultural machine. The new weight is stored as a peak weight in response to determining that the new weight is higher than the previous peak weight. Operational parameters associated with the new weight can also be stored in response to determining that the new weight is higher than the previous peak weight.

15 Claims, 5 Drawing Sheets

(56) References Cited

U.S. PATENT DOCUMENTS

| | | | | |
|---|---|---|---|---|
| 2003/0024746 A1* | 2/2003 | Orlando | ............... | G01G 19/08 |
| | | | | 177/136 |
| 2008/0078587 A1* | 4/2008 | Johansen | ............... | G01G 19/08 |
| | | | | 177/136 |
| 2011/0137611 A1* | 6/2011 | Campbell | ............ | G01G 19/083 |
| | | | | 702/173 |
| 2011/0220677 A1* | 9/2011 | Bertolani | ............... | B60P 1/42 |
| | | | | 222/1 |
| 2012/0099948 A1* | 4/2012 | Bump | ............... | G01G 13/16 |
| | | | | 414/21 |
| 2014/0284118 A1* | 9/2014 | Van Mill | ............... | B65G 43/00 |
| | | | | 177/1 |
| 2015/0298706 A1* | 10/2015 | Hall | ............... | B60W 40/13 |
| | | | | 701/37 |
| 2018/0003546 A1* | 1/2018 | Mignon | ............... | G01G 23/01 |

\* cited by examiner

| | Date | Time | Weight | Speed | RPM | Pressure | Temperature | Location |
|---|---|---|---|---|---|---|---|---|
| 302 | 3/15/2015 | 08:00:00 | 2000 | 15 | 500 | 10 | 182 | 41.68704251745914, -74.40787975850981 |
| 304 | 3/15/2015 | 08:00:01 | 2257 | 14 | 500 | 10 | 182 | 41.68704251745915, -74.40787975850981 |
| 306 | 3/15/2015 | 08:00:02 | 2260 | 13 | 500 | 10 | 182 | 41.68704251745916, -74.40787975850981 |
| 308 | 3/15/2015 | 08:00:03 | 2245 | 14 | 500 | 10 | 182 | 41.68704251745917, -74.40787975850981 |
| 310 | 3/15/2015 | 08:00:04 | 2000 | 15 | 500 | 10 | 182 | 41.68704251745918, -74.40787975850981 |
| | ⋮ | ⋮ | ⋮ | ⋮ | ⋮ | ⋮ | ⋮ | ⋮ |
| | ⋮ | ⋮ | ⋮ | ⋮ | ⋮ | ⋮ | ⋮ | ⋮ |

FIG. 3

METHOD AND APPARATUS FOR PEAK WEIGHT DETECTION

BACKGROUND

The present disclosure relates generally to agricultural machines, and more particularly to sensing weights associated with an agricultural machine.

Agricultural machines are designed to be operated within certain parameters. However, users of agricultural machines may operate them outside of these operational parameters either intentionally or unintentionally. Manufacturers of agricultural machines typically offer warranties for manufacturing and/or craftsmanship defects. However, damage caused by operating a machine outside its operational parameters may not be covered under the manufacturer's warranty. Visual inspection of damage to an agricultural machine can be insufficient to determine if the machine has been operated outside acceptable operational parameters.

SUMMARY

In one embodiment, a method for determining a peak weight associated with an agricultural machine includes the step of determining a weight associated with the agricultural machine. Operational parameters are stored in response to determining that the weight is above a threshold. The threshold can be based on a maximum weight associated with the agricultural machine and set via user input to a machine control indicator. In one embodiment, a new weight associated with the agricultural machine is determined. The new weight is compared to a previous peak weight associated with the agricultural machine. The new weight is stored as a peak weight in response to determining that the new weight is higher than the previous peak weight. Operational parameters associated with the new weight can also be stored in response to determining that the new weight is higher than the previous peak weight. In one embodiment, the determining that the new weight is higher than the previous peak weight based on the new weight being a specific percentage higher than the previous peak weight. In one embodiment, the weight associated with the agricultural machine is determined periodically. The frequency at which the weight is determined can based on a responsiveness of a weight sensor associated with the agricultural machine.

An apparatus pertaining to peak weight detection is also disclosed.

BRIEF DESCRIPTION OF THE DRAWINGS

FIG. 3 depicts a table containing operational parameter records;

DETAILED DESCRIPTION

The weight of an object is the force produced by the object due to gravity. The weight of an object is typically defined as the product of the mass of the object and the acceleration due to gravity. The weight of an object measured using a device, such as a scale, requires the object and the device to be not accelerating in order to determine the object's actual weight. For example, the weight of an object placed on a scale when the scale and the object are stationary (or moving at a constant velocity) can be considered to be the actual weight of the object. If the object is placed on the scale and the scale is then accelerated upward, the weight of the object identified by the scale will be higher than the actual weight of the object. The weight of the object identified by the scale is the product of the mass of the object and the combined acceleration due to gravity and the upward motion. Agricultural equipment is often used to hold and transport agricultural materials and includes one or more load cells for measuring the weight of material added to the equipment. For example, a feed mixer with one or more load cells can be loaded with animal feed to be mixed and then towed by a tractor to a location for discharge. The load cells sense the weight of material (e.g. animal feed) contained in the feed mixer. As the feed mixer is towed by the tractor, the wheels of the feed mixer may travel over surface imperfections such as potholes, ditches, or bumps. When a surface imperfection causes the feed mixer to be accelerated vertically upward, the weight of material in the feed mixer sensed by the load cells can change. For example, when the feed mixer travels over a bump, the load cells sense the apparent weight of the material in the feed mixer as higher than the actual weight of the material when it is not vertically accelerated upward by surface imperfections. The weight of material sensed by the load cells of the feed mixer can vary as the feed mixer travels over a surface.

Figure 1:
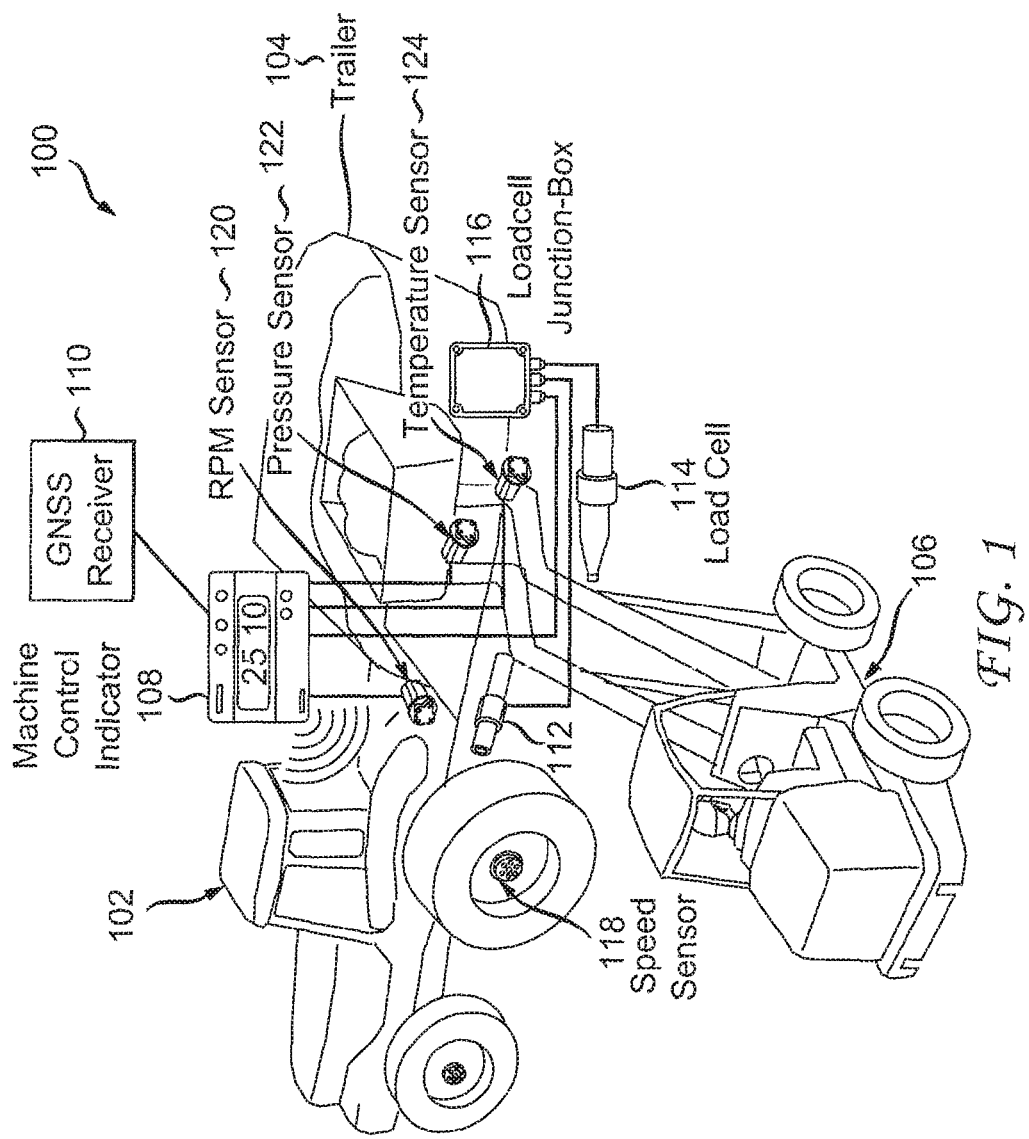
FIG. 1 depicts a system for peak weight detection according to one embodiment.

FIG. 1 depicts a system 100 for peak weight detection according to one embodiment. System 100 is configured to detect when a peak weight associated with an agricultural machine has occurred. The peak weight can be an actual weight or an apparent weight. For example, a peak weight can occur if an agricultural machine is overloaded with a material, such as feed. A peak weight can also occur if the agricultural machine travels over surface imperfections such as rocks, ditches, or bumps at a certain speed. The peak weight information, along with additional information, such as operational parameters and a location of the agricultural machine when the peak weight occurred are stored for later evaluation.

Tractor 102 is an agricultural machine equipped with machine control indicator 108 and a Global Navigation Satellite System (GNSS) receiver 110. GNSS receiver 110 determines a location of tractor 102 and transmits location data to machine control indicator 108. Machine control indicator 108 receives data from GNSS receiver 110 along with data from various sensors. Machine control indicator 108, in one embodiment, is configured to display operational parameters to a user. Machine control indicator 108 can be configured in one embodiment to receive input from a user via a keyboard, touch screen and/or additional input devices.

Tractor 102 is mechanically coupled to trailer 104 so that trailer 104 can be moved by tractor 102. Trailer 104 can be an agricultural machine such as a feed mixer for mixing ingredients to be fed to animals. Trailer 104, in one embodiment, includes several devices for sensing operational parameters. Load cells 112, 114 (also referred to as weight sensors) are in communication with load cell junction-box 116 and are used to detect a weight of material added to trailer 104. Load cell junction-box 116 receives signals from load cells 112, 114 and, in one embodiment, converts these signals to weight values that are transmitted from load cell junction-box 116 to machine control indicator 108. It should be noted that a tare weight (i.e., weight of empty container associated with trailer 104 used for receiving material) can be subtracted from a sensed weight value in order to zero the weight value when the container is empty. Front loader 106 is shown in FIG. 1 preparing to add material to trailer 104.

System 100 can include speed sensor 118 in one embodiment. Speed sensor 118 is a sensor for detecting the speed at which tractor 102 is travelling. In one embodiment, speed sensor 118 can be a wheel mounted sensor that generates a signal in response to rotation of the wheel. Speed sensor 118 can also be other types of motion sensors. It should be noted that the speed of tractor 102 is substantially the same as the speed of trailer 104 when trailer 104 is coupled to tractor 102. In one embodiment, speed sensor 118 is located on trailer 104 in order to determine the speed of trailer 104 directly instead of inferring the speed of trailer 104 based on the speed of tractor 102. The speed of tractor and/or trailer is determined by GNSS receiver 110 in one embodiment.

Trailer 104 can include rotations per minute (RPM) sensor 120 for detecting the rotational speed of a component of trailer 104. For example, RPM sensor 120 can be used to determine the rotational speed of a drive shaft of trailer 104. In one embodiment, the drive shaft of trailer 104 is turned by tractor 102 via a power coupling such as a power take off. RPM sensor 120 can alternatively be used to sense the rotational speed of an implement of trailer 104 such as an auger or mixing blade. Trailer 104 can also have pressure sensor 122 and temperature sensor 124 for sensing the hydraulic pressure and temperature of a gearbox associated with trailer 104.

It should be noted that the locations of components shown in FIG. 1 are exemplary. The components can be mounted in other locations. For example, machine control indicator 108 and/or GNSS receiver 110 can be located on trailer 104.

Figure 2:
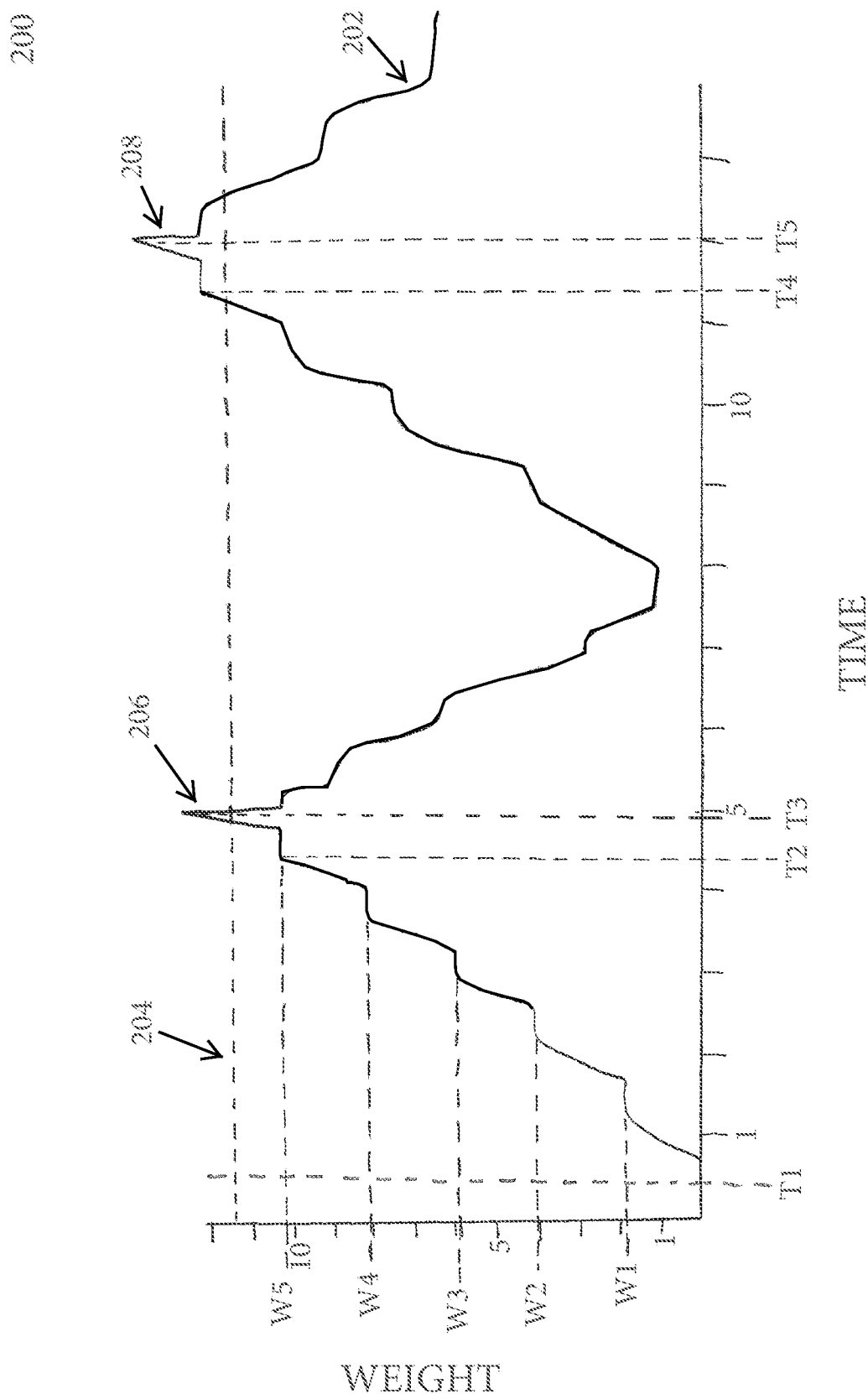
FIG. 2 depicts a graph showing a weight associated with an agricultural machine over time.

FIG. 2 depicts graph 200 showing weight of material on trailer 104 over time. The horizontal axis of the graph depicts time and the vertical axis of the graph depicts weight. The units of time and weight can be set by a user depending on the desired resolution of graph 200. Line 202 depicts the weight of material in trailer 104 over time as sensed by load cells 112, 114. As shown in graph 200, trailer 104 is empty at time T1. As material is added to trailer 104, for example by front loader 106, the weight sensed increases as shown by weights W1, W2, W3, W4, and W5. At time T2, trailer 104 contains a desired amount of material. After the desired amount of material has been added to trailer 104, tractor 102 is operated to move trailer 104. As trailer 104 is moved, in this example, it travels over a surface imperfection, specifically a bump. The bump causes trailer to accelerate upward as shown by spike 206 at time T3. The sudden increase and subsequent decrease of spike 206 is indicative of upward vertical acceleration of trailer 104 and not a sudden increase and decrease of material loaded onto trailer. This is because the rise and fall of spike 206 would require adding and removing a significant amount of material from trailer 104 at a rate not typically possible during normal loading and unloading. Accordingly, such a rise and fall can be interpreted to be caused by vertical motion of trailer 104 and not by addition and removal of material from trailer 104. It should be noted that, in this example, the peak of spike 206 exceeds threshold 204. The value of threshold 204 (i.e., a particular weight value) is adjustable, in one embodiment, by an authorized user (e.g., a factory representative, trailer manufacturer representative, etc.). In one embodiment, the threshold is set to a maximum weight of material that should not be exceeded.

Abrupt weight changes, such as those associated with spike 206, are typically caused by trailer 104 moving over a rough surface. For example, trailer 104 is loaded with material by a user to certain weight. Trailer 104 is then moved by tractor 102. An abrupt change in weight can be sensed when trailer 104 hits a bump, such as a speed bump, a mound of dirt, a rock, etc. Trailer 104 is abruptly accelerated vertically due to the bump which causes a sudden increase in the weight sensed. After the bump is traversed, the weight sensed returns to the value sensed prior to the abrupt change.

Between time T3 and time T4, material is unloaded (e.g., discharged) from trailer 104 and then additional material is loaded into trailer 104. This is shown in FIG. 2 as the decreasing weights as sensed by load cells 112, 114 followed by increasing weights sensed by load cells 112, 114 until trailer 104 is loaded with a desired amount of material at time T4. It should be noted that the weight of material loaded onto trailer 104 at time T4 is over threshold 204. Trailer 104 is then pulled by tractor 102 and traverses a surface imperfection (e.g., bump) which causes load cells 112, 114 to sense a sudden increase and decrease of weight as shown by spike 208 at time T5. After time T5, material is unloaded (e.g., discharged) from trailer 104.

In one embodiment, sensed weight values that are above threshold 204 cause operational parameters to be captured and stored for later analysis. For example, when spike 206 occurs, operational parameters that occur before, during, and after spike 206 are stored. The amount of time that operational parameters are stored before spike 206 as well as after spike 206 is also adjustable by an authorized user. In one embodiment, the value for threshold 204 is based on trailer 104. For example, if trailer 104 is a feed mixer that is designed to hold 2,000 pounds of material, threshold 204 can be set to a value above 2,000 pounds. The value of threshold 204 can also be based on a maximum weight of material trailer 104 can hold before it is damaged. For example, if trailer 104 is designed to hold 2,000 pounds of material and will be damaged if loaded with more than 2,500 pounds of material, threshold 204 can be set to 2,250 pounds.

FIG. 3 depicts a table 300 in which information is stored for later analysis. Table 300 includes a plurality of records 302, 304, 306, 308, and 310. Each record includes values for a date 312 and time 314 indicating when the operational parameters identified in the particular record were captured. Each record also includes a plurality of operational parameters according to one embodiment. Weight 316 identifies a weight value indicated by load cells 112, 114 and load cell junction-box 116 shown in FIG. 1. Speed 318 identifies a speed value of trailer 104 indicated by speed sensor 118 shown in FIG. 1. RPM 320 identifies an RPM value identified by RPM sensor 120 shown in FIG. 1. Pressure 322 identifies a pressure value indicated by pressure sensor 122 shown in FIG. 1. Temperature 324 identifies a temperature value indicated by temperature sensor 124 shown in FIG. 1. Location 326 identifies a location determined by GNSS receiver 110 shown in FIG. 1. Location 326 is shown in FIG. 3 using longitude and latitude values indicating a position of GNSS receiver 110 at the date and time associated with the particular record. Other location values can be used to identify the location of GNSS receiver 110 as well.

Figure 4:
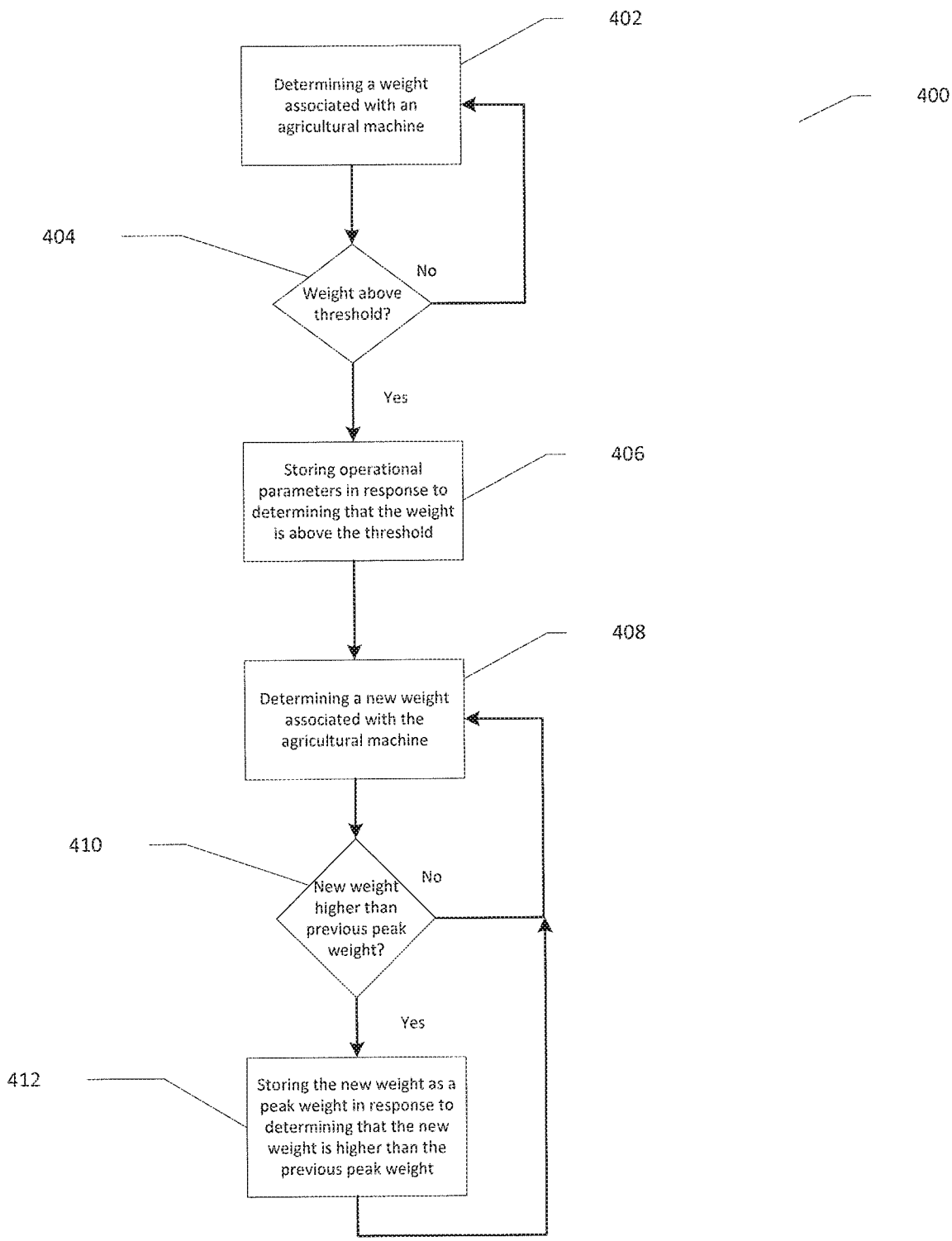
FIG. 4 depicts a flowchart of a method for determining peak weight associated with an agricultural machine.

FIG. 4 depicts a flow chart 400 of a method for detecting, at a machine control indicator, a peak weight associated with an agricultural machine according to one embodiment. At step 402, a weight associated with an agricultural machine is determined. In one embodiment, machine control indicator 104 detects the weight based on data from load cells 112, 114. In one embodiment, the weight is determined periodically. The frequency at which the weight is determined can based on a responsiveness of load cells 112, 114, speed of tractor 102 or trailer 104, or other factors. At step 404, machine control indicator 108 determines if the weight is above a threshold. The threshold can be a maximum weight associated with the agricultural machine and can be set by an authorized user. If the weight is not above the threshold, the method returns to step 402. If the weight is above the threshold, the method proceeds to step 406. At step 406, operational parameters are stored in response to determining that the weight is above the threshold. The operational parameters at the time the weight above the threshold occurred, as well as operational parameters associated with times before and after, can be stored. The operational parameters are stored as records with each record having a date and time stamp as shown in FIG. 3.

Machine control indicator 108 continues to receive and analyze data from load cells 112, 114. At step 408, machine control indicator 108 determines a new weight associated with the agricultural machine. At step 410, machine control indicator 108 compares the new weight to a previous peak weight. If the new weight is not higher than the previous peak weight, the method returns to step 408. If the new weight is higher than the previous peak weight, the method proceeds to step 412. At step 412, the new weight is stored as a peak weight in response to determining that the new weight is higher than the previous peak weight. The method then returns to step 408.

Machine control indicator 108 can be configured to store data pertaining to multiple peak weights. For example, the last 5 peak weights detected can be stored so that the data can be analyzed in order to determine if there is a pattern of overloading of the agricultural machine.

In one embodiment, the threshold can be based on a maximum weight associated with the agricultural machine. The threshold can be set via user input to machine control indicator 108. In one embodiment, the threshold can be set based on a previous peak weight. For example, machine control indicator 108 can start with a threshold of zero and determine a new peak weight based on a weight exceeding the threshold. The new weight then becomes a peak weight. Each time a new weight exceeds the threshold, that weight is determined to be the peak weight and the threshold is set to a value equivalent to the peak weight. As such, each new peak weight is set as a new threshold. In one embodiment, a new weight must be a specific percentage higher than (e.g., above) the threshold (e.g. a previous peak weight) in order for the new weight to be considered higher than the threshold. For example, a new weight may only be determined to be a peak weight if the new weight is five percent higher than the threshold.

It should be noted that an agricultural machine can be loaded with agricultural material and still be under a maximum weight associated with the agricultural machine. However, an agricultural machine loaded with agricultural material to a weight under the agricultural machine's maximum weight can exceed the agricultural machine's maximum weight due to a change in vertical acceleration. For example, an agricultural machine loaded with material to a weight near the machine's maximum weight can experience a vertical acceleration due to travel over surface imperfections such as pot holes and/or ditches. Although the actual weight of material loaded into the agricultural machine is not above the machine's maximum weight, the vertical acceleration caused by movement of the machine over a surface imperfection can cause an upward vertical acceleration that can cause the apparent weight of material to increase above the machine's maximum weight. This apparent weight of material can damage the agricultural machine in the same manner that overloading the machine with agricultural machine with material can damage the agricultural machine. Travelling at high speeds over surface imperfections can cause high vertical accelerations as compared to travelling at lower speeds over the same imperfections.

In one embodiment, access to peak weight data and settings associated with peak weight are protected to prevent access by unauthorized users. For example, peak weight data and settings can be password protected in order to prevent access to the information without a password.

Figure 5:
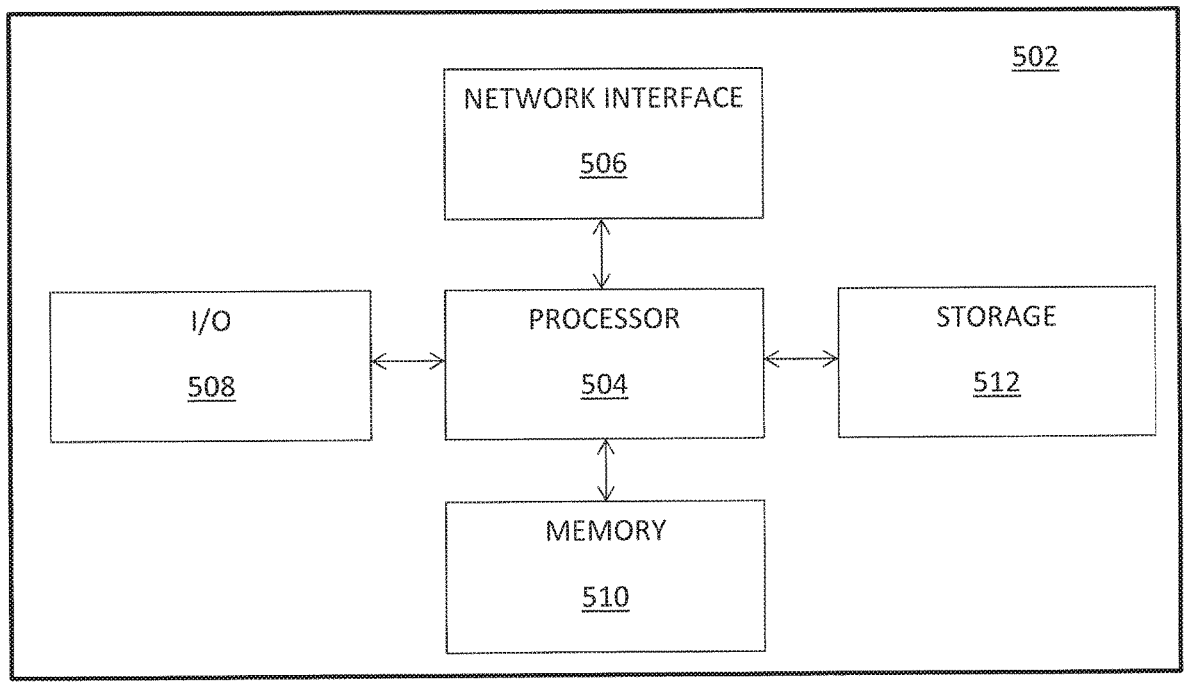
FIG. 5 depicts a high-level block diagram of a computer for implementing components shown in FIG. 1 according to one embodiment.

Machine control indicator 108, GNSS receiver 110, and other components depicted in FIG. 1 can be implemented using a computer. A high-level block diagram of such a computer is illustrated in FIG. 5. Computer 502 contains a processor 504 which controls the overall operation of the computer 502 by executing computer program instructions which define such operation. The computer program instructions may be stored in a storage device 512, or other computer readable medium (e.g., magnetic disk, CD ROM, etc.), and loaded into memory 510 when execution of the computer program instructions is desired. Thus, the method steps of FIG. 4 can be defined by the computer program instructions stored in the memory 510 and/or storage 512 and controlled by the processor 504 executing the computer program instructions. For example, the computer program instructions can be implemented as computer executable code programmed by one skilled in the art to perform an algorithm defined by the method steps of FIG. 4. Accordingly, by executing the computer program instructions, the processor 504 executes an algorithm defined by the method steps of FIG. 4. The computer 502 also includes one or more network interfaces 506 for communicating with other devices via a network. The computer 502 also includes input/output devices 508 that enable user interaction with the computer 502 (e.g., display, keyboard, mouse, speakers, buttons, etc.) One skilled in the art will recognize that an implementation of an actual computer could contain other components as well, and that FIG. 5 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method comprising:
 receiving a value for a threshold, the value based on:
  a mass of material located in an agricultural machine,
  a vertical acceleration of the mass of material as the agricultural machine moves, and
  the agricultural machine;
 determining a speed of the agricultural machine;
 periodically determining a weight associated with the agricultural machine based on data from a weight sensor located on the agricultural machine, wherein a frequency at which the weight is determined is based on the speed of the agricultural machine and a responsiveness of the weight sensor;

determining if the weight is above the threshold; and storing operational parameters in response to determining that the weight is above the threshold.

2. The method of claim 1, further comprising:

identifying a new weight associated with the agricultural machine;

comparing the new weight to a previous peak weight associated with the agricultural machine; and storing the new weight as a peak weight in response to determining that the new weight is higher than the previous peak weight.

3. The method of claim 2, further comprising:

storing operational parameters associated with the new weight in response to determining that the new weight is higher than the previous peak weight.

4. The method of claim 2, wherein the determining that the new weight is higher than the previous peak weight further comprises:

determining that the new weight is a specific percentage higher than the previous peak weight.

5. The method of claim 1, wherein the value is further based on a previous peak weight.

6. An apparatus comprising:

a weight sensor; and a machine control indicator in communication with the weight sensor, the machine control indicator performing operations comprising:

receiving a value for a threshold, the value based on a mass of material located in an agricultural machine, a vertical acceleration of the mass of material as the agricultural machine moves, and the agricultural machine;

determining a speed of the agricultural machine;

periodically determining a weight associated with the agricultural machine based on data from the weight sensor, wherein a frequency at which the weight is determined is based on the speed of the agricultural machine and a responsiveness of the weight sensor;

determining if the weight is above the threshold; and storing operational parameters in response to determining that the weight is above the threshold.

7. The apparatus of claim 6, the operations further comprising:

identifying a new weight associated with the agricultural machine;

comparing the new weight to a previous peak weight associated with the agricultural machine; and storing the new weight as a peak weight in response to determining that the new weight is higher than the previous peak weight.

8. The apparatus of claim 7, the operations further comprising:

storing operational parameters associated with the new weight in response to determining that the new weight is higher than the previous peak weight.

9. The apparatus of claim 7, wherein the determining that the new weight is higher than the previous peak weight further comprises:

determining that the new weight is a specific percentage higher than the previous peak weight.

10. The apparatus of claim 6, wherein the value is further based on a previous peak weight.

11. A method comprising:

receiving a value for a first threshold, the value based on a mass of material located in an agricultural machine, a vertical acceleration of the mass of material as the agricultural machine moves, and the agricultural machine;

determining a speed of the agricultural machine;

periodically determining a weight of material associated with the agricultural machine based on data from a weight sensor located on the agricultural machine, wherein a frequency at which the weight is determined is based on the speed of the agricultural machine and a responsiveness of the weight sensor;

storing a plurality of operational parameters in response to determining that the weight of material is above the first threshold; and updating the first threshold to generate a second threshold in response to determining that the weight of material is above the first threshold.

12. The method of claim 11, further comprising:

identifying a new weight associated with the agricultural machine;

comparing the new weight to the second threshold; and storing a second plurality of operational parameters in response to determining that the new weight is above the second threshold.

13. The method of claim 12, further comprising:

updating the second threshold to generate a third threshold in response to determining that the new weight is above the second threshold.

14. The method of claim 12, wherein the determining that the new weight is above the second threshold further comprises:

determining that the new weight is a specific percentage above the second threshold.

15. The method of claim 11, wherein the first threshold is further based on a previous peak weight.

* * * * *